United States Patent
Siegel et al.

(10) Patent No.: US 9,552,489 B1
(45) Date of Patent: Jan. 24, 2017

(54) RESTRICTING NETWORK SPIDERING

(71) Applicant: IMDB.com, Inc., Seattle, WA (US)

(72) Inventors: Hilliard Bruce Siegel, Seattle, WA (US); Murray Leigh Chapman, Carnation, WA (US)

(73) Assignee: IMDB.com, Inc., Seattle, WA (US)

( * ) Notice: Subject to any disclaimer, the term of this patent is extended or adjusted under 35 U.S.C. 154(b) by 568 days.

(21) Appl. No.: 14/031,935

(22) Filed: Sep. 19, 2013

(51) Int. Cl.
*G06F 21/62* (2013.01)
*G06F 17/30* (2006.01)
*H04L 29/06* (2006.01)

(52) U.S. Cl.
CPC ......... *G06F 21/62* (2013.01); *G06F 17/30864* (2013.01); *H04L 63/1425* (2013.01); *H04L 63/1441* (2013.01)

(58) Field of Classification Search
CPC G06F 21/62; G06F 17/30864; H04L 63/1441; H04L 63/1425
See application file for complete search history.

(56) References Cited

U.S. PATENT DOCUMENTS

| | | | | |
|---|---|---|---|---|
| 7,599,920 B1* | 10/2009 | Fox | .................. | G06F 17/30864 |
| 8,271,650 B2* | 9/2012 | Alexander | ........ | G06F 17/30899 709/225 |
| 8,307,073 B1* | 11/2012 | Brundage | ............... | H04L 67/02 709/203 |
| 2003/0018779 A1* | 1/2003 | Hughes | ................ | G06F 21/552 709/224 |
| 2007/0078983 A1* | 4/2007 | Modrall | ................. | G06F 21/62 709/226 |
| 2007/0083519 A1* | 4/2007 | Daniels | .................. | G06Q 30/00 |
| 2010/0023751 A1* | 1/2010 | He | ....................... | H04L 63/0428 713/150 |
| 2010/0192201 A1* | 7/2010 | Shimoni | ................. | G06F 21/55 726/3 |
| 2011/0055400 A1* | 3/2011 | Alexander | ........ | G06F 17/30887 709/226 |
| 2011/0282859 A1* | 11/2011 | Ionescu | ............. | G06F 17/30864 707/709 |
| 2011/0282997 A1* | 11/2011 | Prince | ................. | H04L 63/1458 709/226 |
| 2011/0289116 A1* | 11/2011 | Horadan | ................ | G06F 21/10 707/781 |
| 2012/0124372 A1* | 5/2012 | Dilley | ................. | H04L 67/2819 713/162 |
| 2012/0191855 A1* | 7/2012 | Alexander | ........ | G06F 17/30899 709/225 |

OTHER PUBLICATIONS

Tan, Pang-Ning et al., "Discover of Web Robot Sessions based on their Navigational Patterns", Data Mining and Knowledge Discovery Jan. 2002, vol. 6, Issue 1, pp. 9-35.*
Guo, Weigang et al., "Web Robot Detection Techniques Based on Statistics of Their Requested URLResources", Proceedings of ninth international conference on computer supported cooperative work in design, 2005, pp. 302-306.*

* cited by examiner

*Primary Examiner* — Michael Pyzocha
(74) *Attorney, Agent, or Firm* — Thomas | Horstemeyer, LLP (57) ABSTRACT

Disclosed are various embodiments for a request monitoring application. Content identifiers are generated according to a known sequence or pattern. Requests for invalid content identifiers are logged. Response behavior to subsequent requests is modified when a number of requests from a source having invalid content identifiers meets a threshold.

20 Claims, 4 Drawing Sheets

RESTRICTING NETWORK SPIDERING

BACKGROUND

Network spiders programmatically attempt to access resources of a network site. This may be performed by repeatedly sending generated requests to the network site to catalog the received responses. The network site may experience a decrease in performance due to handling the requests of the network spider. Additionally, the network sites are vulnerable to having content obtained by network sites duplicated or distributed without authorization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Content served by network sites such as web sites may be stored in a table, relational model, or other data structure. The content may be indexed by key values which uniquely identify each content entry. The key values are often sequential values which are incremented by one. For example, a first key value may be "100," a next key value may be "101," etc. The key values may be represented as components of a uniform resource locator (URL), input parameter, or other value which is used by a network spider to send requests to the network site. The network spider may then modify a request parameter corresponding to the key value by incrementing a previous key value. This allows the network spider to programmatically scrape a network site by automatically generating requests according to the key value sequence, and systematically retrieve content from the network site.

Network spiders may scrape a network site for various reasons. A search engine may implement a spider to scrape a network site in order to index network pages in order to improve search results. A network spider may also be used to access content of a network site for unauthorized reproduction or distribution. For example, a network site may implement a database of films, comic books, or other media which is spread across multiple network pages. A spider may then attempt to access the database in order to create a duplicate copy. The duplicate copy may then be distributed to a competing service. As another example, a spider may access an electronic commerce site to obtain metadata about a product catalog. The metadata may then be used in a competing electronic commerce site.

If the key values are generated by a technique other than one assumed by the network spider, such as incrementing a value by one, the network spider may automatically generate requests for invalid key values. For example, key values may be generated by incrementing a value by nine. This may result in key values of "1," "10," "19," etc. A network spider generating requests by incrementing a value by one would generate requested key values for "1," "2," "3," etc. This results in a number of invalid requests which is proportionally greater than generated valid requests. As these invalid key values are not contained within links of the network site, it is likely that requests containing these invalid key values are generated by unauthorized network spiders.

A request monitoring application may detect when requests with invalid key values are obtained from a request source. The request source may include a client device, a network address, a network address range, or another source. If a number of requests with invalid key values are obtained from the same request source, it indicates that the request source corresponds to a network spider. The request monitoring application may then monitor the behavior of a network page server application with respect to the request source. For example, the network page server application may be configured deny requests sent from the request source. The network page server application may be configured to respond to the requests with fake response data. The network page server application may also be configured to limit bandwidth to the request source. Other actions may also be taken with respect to the request source.

In the following discussion, a general description of the system and its components is provided, followed by a discussion of the operation of the same.

Figure 1:
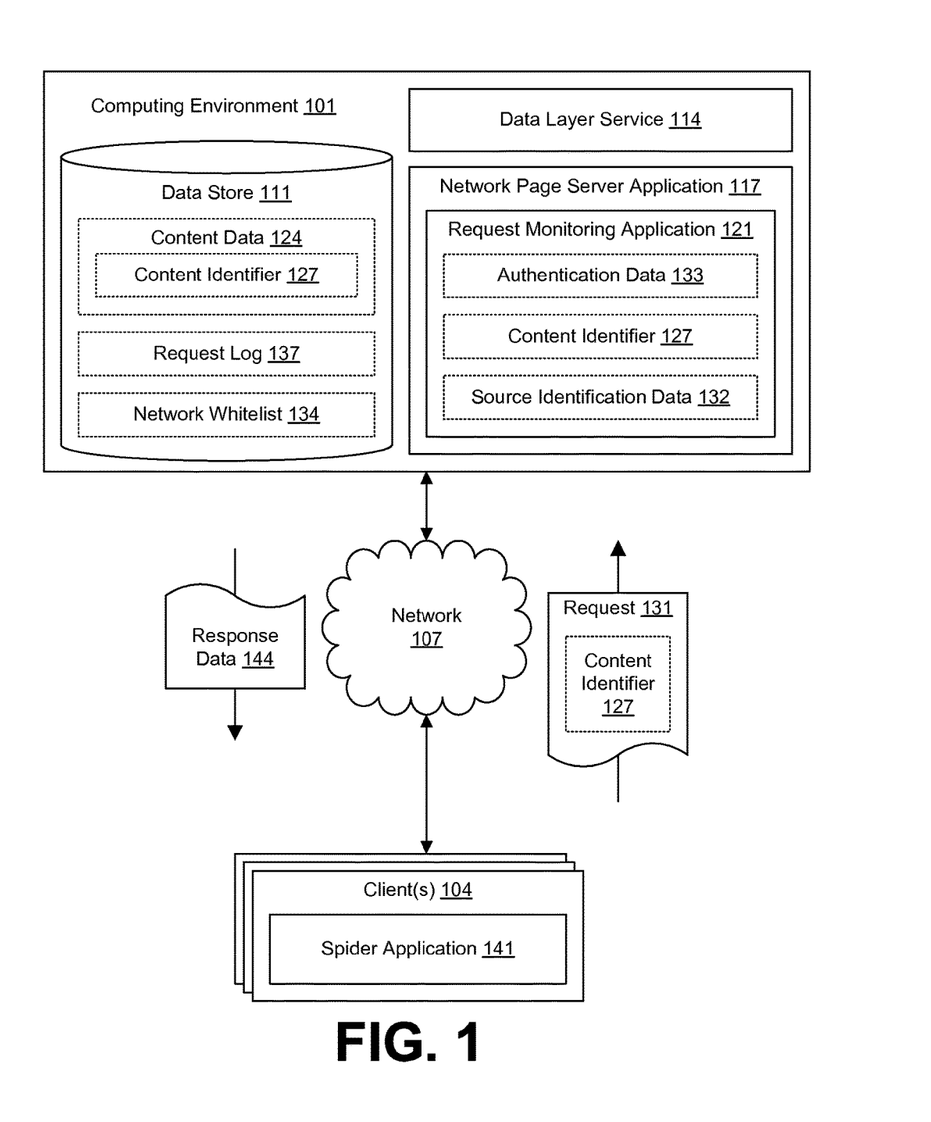
FIG. 1 is a drawing of a networked environment according to various embodiments of the present disclosure.

With reference to FIG. 1, shown is a networked environment 100 according to various embodiments. The networked environment 100 includes a computing environment 101, and a client device 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 101 may comprise, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a hosted computing resource, a grid computing resource and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a data layer service 114, a network page server application 117 having a request monitoring application 121, and other applications, services, processes, systems, engines, or functionality not discussed in detail herein. The data layer service 114 is executed to read content data 124 from the data store 111 and write content data to the data store 111. To this end, the data layer service 114 calculates a content identifier 127 upon creation of a respective content data 124 entry. The content identifier 127 comprises a unique identifier, key value, index value, or other value to identify a respective content data 124 entry. In some embodiments, the content identifier 127 may comprise a key value for indexing a database stored in the data store 111. The data layer service 114 may be configured to provide content data 124 to the network page server application 117 to facilitate generating network pages embodying content data 124 as will be described below.

The network page server application 117 is executed to generate network pages such as web pages for communication to a client 104 via the network 107. The network page server application 117 may generate network pages embodying content data 124 identified by a corresponding to a content identifier 127 encoded in a request 131 from the client 104.

The requests 131 may also include source identification data 132 indicating one or more network 107 sources of the requests 131. Source identification data 132 may include data such as header data included in packets encoding the requests 131, or other data. The source may correspond to one or more clients 104. The source may also correspond to a network 107 address or a range or network 107 addresses. A range of network 107 addresses may include a subnet, or another defined range of network 107 addresses. The source may also correspond to a hardware address, a Media Access Controller (MAC) address, or another address as can be appreciated. Such source identification data 132 may include an operating system identification, an operating system version, a browser identification, a browser version, or other data.

The requests 131 may also include authentication data 133 indicating that a source of requests 131 is authorized to perform certain actions with respect to the network page server application 117, such as spidering, indexing, or other actions. Authentication data 133 may comprise, for example, a unique identifier or token. Authentication data 133 may also include data corresponding to a session with the network page server application 117, including a username, a password, a session identifier, or other data. Authentication data 133 may be encoded in a payload of a packet communicated via the network 107, as a parameter input of a Uniform Resource Locator (URL), or by another approach.

The request monitoring application 121 is executed to detect requests 131 having an invalid content identifier 127. An invalid content identifier 127 is a content identifier 127 which does not correspond to a content data 124 entry stored in the data store 111. In embodiments in which the data layer service 114 generates content identifiers 127 according to a predefined pattern, an invalid content identifier 127 may deviate from that pattern. In other embodiments, an invalid content identifier 127 may include a content identifier 127 which is not included in a known set of valid content identifiers 127, not included in a set of content identifiers 127 identified as accessible to the source of the request 131, or not included in another set of content identifiers 127.

The request monitoring application 121 is further executed to modify a response behavior of the network page server application 117 with respect to a request source when a number of invalid requests with respect to that request source meets or exceeds a threshold. A request source may comprise to an identifier of one or more clients 104, such as a network address, a network address range, a hardware address, a media access controller (MAC) address, or other identifier. A request source may also comprise one or more authentication credentials such as usernames or passwords. A request source may also correspond to other data, The data stored in the data store 111 includes, for example, content data 124 having content identifiers 127, a network whitelist 134, a request log 137, and potentially other data. A request log 137 encodes data associated with requests 131, including a respective content identifier 127. A request log 137 may also encode data corresponding to a client 104 from which a request 131 was obtained, including a source network address, a destination network address, a browser identification, a browser version identification, an operating system, or other attributes of a client 104. A network whitelist 134 encodes one or more network addresses from which requests 131 having invalid content identifiers 127 may be obtained without triggering a modification of response behavior of the network page server application 117 by the request monitoring application 121.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 104 may be configured to execute various applications such as a spider application 141 and/or other applications. The spider application 141 may be executed in a client 104, for example, to access network content served up by the computing environment 101 and/or other servers. The spider application 141 is configured to automatically generate requests 131 by iteratively calculating content identifiers 127 to be included in the requests 131. The client 104 may be configured to execute applications beyond the spider application 141 such as, for example, email applications, social networking applications, word processors, spreadsheets, and/or other applications.

Next, a general description of the operation of the various components of the networked environment 100 is provided. To begin, the data layer service 114 facilitates the creation of content data 124 entries. This may comprise, for example, storing content data 124 entries in the data store 111. Upon creation of a content data 124 entry, the data layer service 114 generates a content identifier 127 for the respective content data 124 entry. The content identifiers 127 may comprise a key to facilitate the operation of a database such as a relational database, or another data structure.

The data layer service 114 generates the content identifiers 127 such that a spider application 141 attempting to programmatically iterate through content identifiers 127 by incrementing a value by one would generate invalid content identifiers 127. To this end, the data layer service 114 may generate content identifiers 127 according to a predefined pattern, sequence, or algorithm. For example, the data layer service 114 may generate content identifiers 127 by incrementing a seed or initial value by a predefined interval. The interval may be greater than one.

For example, a data layer service 114 may generate content identifiers 127 by incrementing a value by five. This may generate content identifiers 127 such as "1," "6," "11," etc. A spider application 141 iterating a seed value of "1" by one may generate a valid content identifier 127 of "1," followed by invalid content identifiers of "2," "3," "4," etc. The content identifiers 127 may also be generated according to a sequence function, or other function. In some embodiments, the data layer service 114 may generate content identifiers 127 randomly or pseudorandomly. Content identifiers 127 may also be generated by another approach.

Next, the network page server application 117 obtains requests 131 from the spider application 141 and potentially other sources via the network 107. The spider application 141 may be executed on one or more clients 104. The requests 131 include a content identifier 127 corresponding to a content data 124 entry to be returned to client 104 executing the spider application 141. As discussed above, the spider application 141 may communicate requests 131 having invalid content identifiers 127. This would be the result of the spider application 141 being configured to programmatically generate the content identifiers 127 of the requests 131 by an approach that deviates from the approach implemented by the data layer service 114 to generate the content identifiers 127. An invalid content identifier 127 is a content identifier 127 which does not correspond to a content data 124.

The network page server application 117 may create a request log 137 entry responsive to obtaining a request 131. The request log 137 entry may be created responsive to obtaining a request 131 for an invalid content identifier 127, responsive to obtaining any request 131, or by another approach. The network page server application 117 may also encode response data 144 embodying content data 124 corresponding to a valid content identifier 127 included in the request 131. The response data 144 may then be communicated to a client 104 via the network 107 corresponding to the source of the respective request 131.

The request monitoring application 121 then determines if a number of requests 131 including invalid content identifiers 127 obtained from a source meets or exceeds a threshold. This may comprise calculating an aggregate total of requests 131 with respect to a network address, range of network addresses, operating system version, browser version, or other data. The aggregate total of requests 131 may be calculated with respect to a combination of data points, such as operating system version and a browser version, or by another approach.

Calculating the number of requests 131 may comprise accessing request log 137 entries corresponding to the source. This may include the entirety of request log 137 entries, or a subset of the request log 137 entries. For example, the request monitoring application 121 may access request log 137 entries corresponding to a predefined time range, falling below a time threshold, or another subset of request log 137 entries.

The threshold may be a predefined number of requests 131 having invalid content identifiers 127. The threshold may also be a predefined percentage of total requests 131 from the source having invalid content identifiers 127. The threshold may also be determined by another approach.

If a number of requests 131 from a source having invalid content identifiers 127 meets or exceeds the threshold, the network page server application 117 may modify behavior in responding to subsequent requests 131 from the source. This may include, for example, denying or failing to respond to subsequent requests 131. The network page server application 117 may, for example, limit a number of transactions that may be completed with respect to the source, or restrict an amount of bandwidth available to the source.

Modifying response behavior may also include communicating response data 144 embodying a "File Not Found" error ("404 Error") or another error in response to subsequent requests 131. For example, the network page server application 117 may encode a "File Not Found" error as a network page in response to a subsequent request 131 including a valid content identifier 127 or an invalid content identifier 127.

As another example, modifying behavior in responding to subsequent requests 131 may include generating response data 144 encoding simulated content data 124. If requests 131 are being generated by a spider application 141 attempting to access the content data 124 for subsequent distribution, the subsequently distributed data may include the simulated content data 124. This may provide evidence that the distributed data was obtained by unauthorized spidering of the content data 124.

For example, content data 124 may encode a database of actors. The content data 124 may include a name, birthplace, filmography, or other data. The network page server application 117 may generate simulated content data 124 including a generated name, birthplace and filmography. Simulated content data 124 may be generated according to a table or data structure, such as a table of first names and last names. First names and last names may then be randomly selected from the tables, or selected by another approach. Simulated content data 124 may also be generated as a function of valid content data 124. For example, simulated content data 124 may include a filmography by including references to films encoded in valid content data 124. Simulated content data 124 may also be generated by another approach.

In other embodiments, modifying behavior in responding to subsequent requests 131 may include a digital fingerprint for inclusion in response data 144. The digital fingerprint may be generated according to the source of the subsequent request 131. For example, the digital fingerprint may include a network address from which the request 131 was sent, or a value generated as a function of the network address. The digital fingerprint may also be generated by another approach.

The network page server application 117 may not modify behavior in responding to subsequent requests 131 from an authorized source. For example, if a number of requests 131 having invalid content identifiers 127 and obtained from an authorized source meet or exceed a threshold, the network page server application 117 may continue to respond to requests 131 without modification. This allows for the network page server application 117 to selectively allow authorized sources such as search engines to index the network site via a spider application 141.

A source may be authorized according to authentication data 133. An authorized source may communicate requests 131 to the network page server application 117 which include an identifier or token indicating the source as authorized. As another example, the source may correspond to a network address or a range of network addresses included in a network whitelist 134. A source may also be authorized by another approach.

Figure 2:
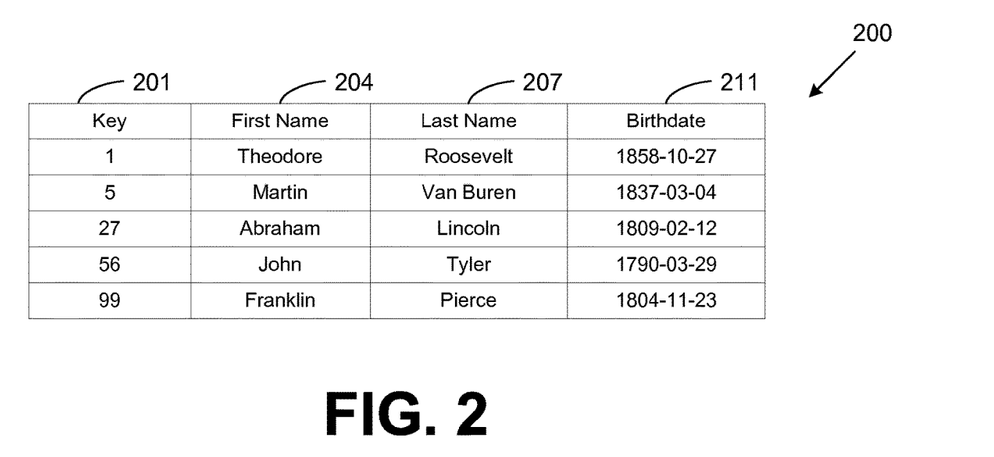
FIG. 2 is a diagram of an example database table implementing generated content identifiers according to various embodiments of the present disclosure.

Referring next to FIG. 2, shown is a diagram 200 of an example database table implementing content identifiers 127 (FIG. 1) generated by a data layer service 114 according to various embodiments of the present disclosure. Item 201 is a column indicating a content identifier 127 for a respective content data 124 (FIG. 1) entry. In this example diagram 200, the content identifiers 127 of item 201 correspond to a key of a relational database table, and are randomly generated. Item 204 is a column representative of a portion of content data 124 corresponding to a first name. Item 207 is a column representative of a portion of content data 124 corresponding to a last name. Item 211 is a column representative of a portion of content data 124 corresponding to a birth date.

Figure 3:
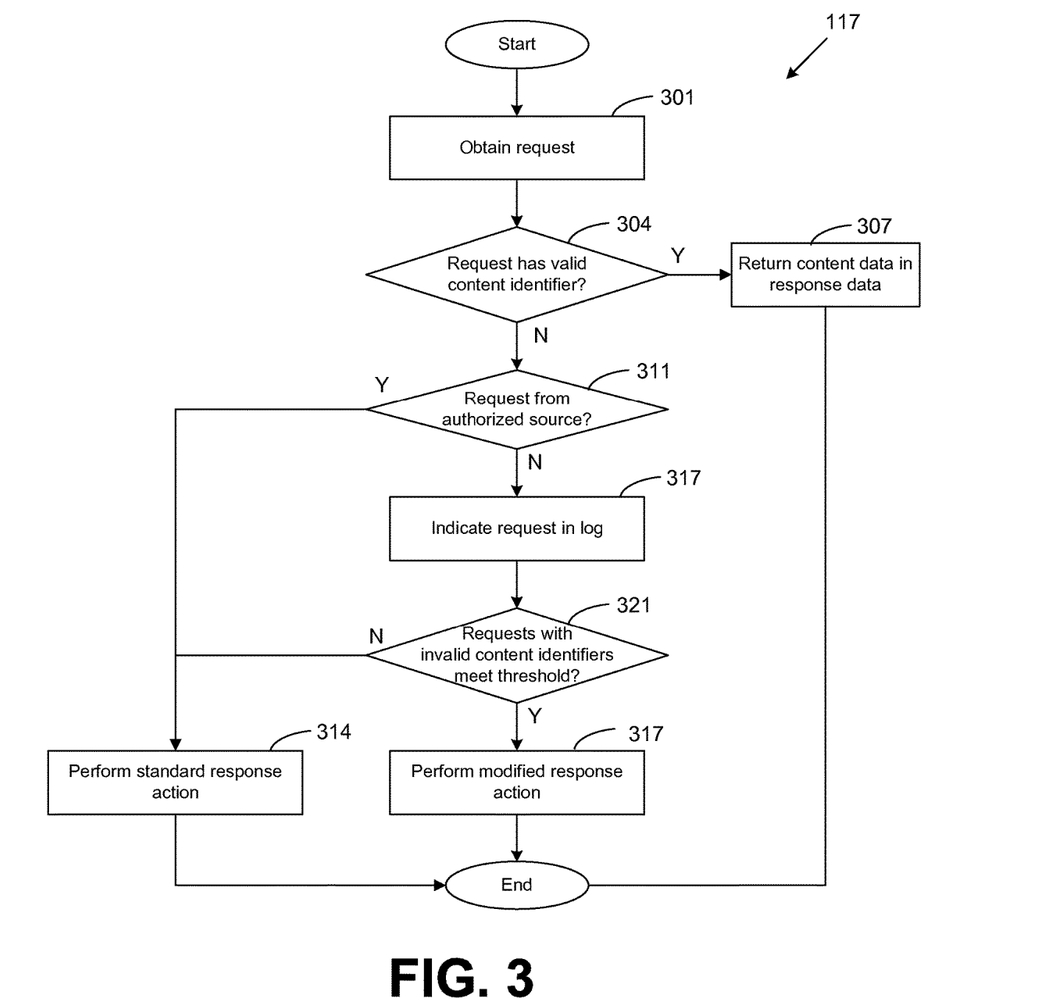
FIG. 3 is a flowchart illustrating one example of functionality implemented as portions of a request monitoring application executed in a computing environment in the networked environment of FIG. 1 according to various embodiments of the present disclosure.

Turning now to FIG. 3, shown is a flowchart that provides one example of the operation of a portion of the network page server application 117 according to various embodiments. It is understood that the flowchart of FIG. 3 provides merely an example of the many different types of functional arrangements that may be employed to implement the operation of the portion of the network page server application 117 as described herein. As an alternative, the flowchart of FIG. 3 may be viewed as depicting an example of elements of a method implemented in the computing environment 101 (FIG. 1) according to one or more embodiments.

Beginning with box 301, the network page server application 117 obtains a request 131 (FIG. 1) from a client 104 (FIG. 1) via the network 107. In box 304, the request monitoring application 121 (FIG. 1) of the network page server application 117 determines if the obtained request 131 includes a valid content identifier 127 (FIG. 1). This may include, for example, determining if the content identifier 127 included in the request 131 corresponds to content data 124 (FIG. 1) stored in the data store 111 (FIG. 1). This may also include, for example, determining if the content identifier 127 deviates from a sequence or pattern according to which the content identifiers 127 are generated by a data layer service 114. Determining if the request 131 includes a valid content identifier 127 may also be performed by another approach.

If the request 131 includes a valid content identifier 127, the process advances to box 307, where the network page server application 117 encodes the content data 124 corresponding to the valid content identifier 127 as response data 144 (FIG. 1). The response data 144 is then communicated to the client 104. If the request 131 does not include a valid content identifier 127, the process advances to box 311, where the request monitoring application 121 determines of the request 131 was obtained from an authorized source.

The client 104 from which the request 131 was obtained may be determined to be an authorized source if a network address corresponding to the client 104 is included in a network whitelist 134 (FIG. 1). The client 104 may also be an authorized source if the client 104 corresponds to authentication data 133 (FIG. 1) communicated to the network page server application 117. The authentication data 133 may be included in a packet encoding the request 131. The authentication data 133 may also be communicated distinct from the request 131.

For example, a client 104 may include a URL parameter in the request 131 indicating an identifier or token which indicates the client 104 as a valid source. As another example, the client 104 may communicate login credentials such as a username or password to the network page server application 117. The client 104 may also communicate a session identifier or other data indicating a previously authorized session between the client 104 and the network page server application 117. Other approaches may also be used to determine if the client 104 from which the request 131 was obtained is an authorized source.

If the client 104 is an authorized source, the network page server application 117 performs a default action for requests 131 including invalid content identifiers 127. This may include performing a network redirection or forwarding, encoding an error message or notification as response data 144, or performing another action. After performing the default action, the process ends.

If the client 104 is not an authorized source, the process advances to box 317, where the request monitoring application 121 notes the request 131 in a request log 137 (FIG. 1) indicating requests 131 having invalid content identifiers 127. Next, in box 321, the request monitoring application 121 determines if a number of requests 131 from the client 104 and having an invalid content identifier 127 meets a threshold. This may comprise, for example, determining if a percentage of requests 131 obtained from the client 104 include an invalid content identifier 127. This may also comprise determining if a number of requests 131 obtained from the client 104 within a time window meet a predefined threshold. Determining the number of requests 131 obtained from the client 104 may be facilitated by accessing request log 137 entries corresponding to the client 104, or by another approach.

If the number of requests 131 from the client 104 and having an invalid content identifier 127 falls below the threshold, the process advances to box 314 where the network page server application 117 performs a standard response to the request 131. Otherwise, the process advances to box 317, where the network page server application 117 performs a modified response to the request 131.

A modified response to the request 131 may include, for example, denying or ignoring the request 131. A modified response to the request 131 may also include restricting a number or a rate of future transactions with respect to the client 104. A modified to the response to the request 131 may also comprise generating simulated content data 124 for encoding as response data 144 communicated to the client 104. The simulated content data 124 may include a digital fingerprint generated as a function of a network address associated with the client 104, or another identifier. Additionally, the network page server application 117 may perform modified responses in response to subsequent requests 131 obtained from the client 104. The modified responses may be performed in response to requests 131 including valid or invalid content identifiers 127. Other approaches may also be used to perform a modified response to a request 131. After performing the modified response to the request 131, the process ends.

Figure 4:
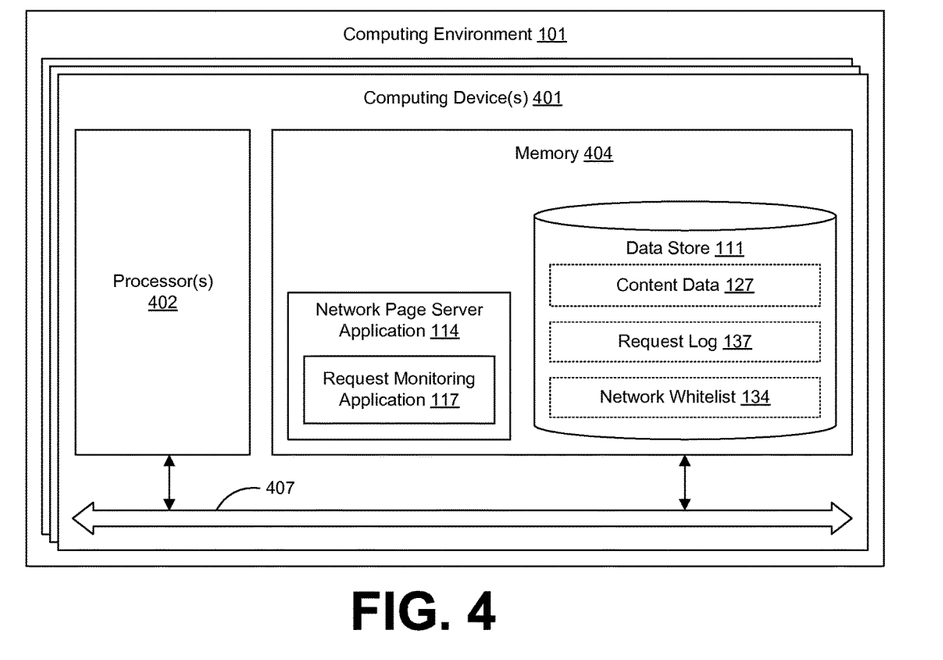
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a network page server application 117 having a request monitoring application 121, and potentially other applications. Also stored in the memory 404 may be a data store 111 storing content data 124, a request log 137, a network whitelist 134, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the request monitoring application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the network page server application 117 having a request monitoring application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a request monitoring application 121, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the request monitoring application 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 401, or in multiple computing devices in the same computing environment 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
    randomly generate a plurality of content identifiers, each of the plurality of content identifiers comprising a respective key value identifying a respective one of a plurality of content entries, and the plurality of content entries being indexed according to the respective key value;
    obtain a request from a client corresponding to a network address;
    determine that the network address is included in a plurality of validated network addresses;
    determine that a quantity of a plurality of previously obtained requests from the network address and having a requested content identifier excluded from the plurality of content identifiers meets a threshold;
    perform, responsive to the quantity meeting the threshold and the network address being excluded from the valid network addresses, an action in response to the request; and
    wherein the action comprises at least one of denying the request, restricting a bandwidth to the network address, or communicating a response data comprising simulated content data to the network address.

2. The non-transitory computer-readable medium of claim 1, wherein the response data comprises a digital fingerprint based at least in part on the network address.

3. A system, comprising:
    at least one computing device configured to at least:
        generate a plurality of content identifiers, each of the plurality of content identifiers comprising a key value of a respective one of a plurality of content entries, the respective one of the plurality of content entries being indexed according to the key value, and the plurality of content identifiers being generated by at least one of a random generation or an increment of a previously generated content identifier by an interval greater than one;
        determine that a quantity of a plurality of requests obtained from a source and having a requested content identifier distinct from the plurality of content identifiers meets a threshold; and
        modify a response behavior with respect to the source responsive to the quantity meeting the threshold.

4. The system of claim 3, wherein the threshold comprises a percentage of the plurality of requests.

5. The system of claim 3, wherein the source is one of a plurality of sources, and the at least one computing device is further configured to at least identify the source as a function of header data included in the plurality of requests.

6. The system of claim 5, wherein the header data comprises at least one of a source Internet Protocol (IP address), a browser identifier, or an operating system identifier.

7. The system of claim 3, wherein modifying the response behavior further comprises restricting a bandwidth to the source.

8. The system of claim 3, wherein modifying the response behavior further comprises modifying another request obtained from the source.

9. The system of claim 3, wherein the requested content identifier is a first requested content identifier, and modifying the response behavior further comprises communicating, in response to another request obtained from the source having a second requested content identifier included in the content identifiers, response data indicating that a requested resource identified in the other request cannot be found.

10. The system of claim 3, wherein modifying the response behavior further comprises communicating, in response to another request obtained from the source, a response data comprising simulated content data to the source.

11. The system of claim 3, wherein the source comprises a network address, a subnet, or a network address range.

12. A method, comprising:
    generating, in the computing device, a plurality of content identifiers, each of the plurality of content identifiers comprising a key value of a respective one of a plurality of content entries, the plurality of content entries being indexed according to the key value, and the plurality of content identifiers being generated by at least one of a random generation or an increment of a previously generated content identifier by an interval greater than one;

determining, in the computing device, whether a request source is a validated request source;

determining, in the computing device, whether a quantity of a plurality of requests obtained from the request source and having a requested content identifier distinct from the plurality of content identifiers meets a threshold; and modifying, in the computing device, responsive to the quantity meeting the threshold and the request source not being a validated request source, a response behavior with respect to the request source.

13. The system of claim 3, wherein the at least one computing device is further configured to at least generate, in response to an addition of a content entry to the plurality of content entries, a corresponding content identifier.

14. The method of claim 12, wherein determining whether the request source is the validated request source comprises determining, in the computing device, whether the request source corresponds to a validated network address or a validated network address range.

15. The method of claim 12, wherein determining whether the request source is the validated request source comprises determining, in the computing device, whether the plurality of requests comprise a valid unique identifier or an authentication token.

16. The method of claim 12, wherein modifying the response behavior further comprises communicating, in response to another request obtained from the request source, a response data encoding simulated content data to the request source.

17. The method of claim 16, wherein the response data comprises a digital fingerprint corresponding to the request source.

18. The method of claim 12, wherein the plurality of content identifiers correspond to a plurality of database keys.

19. The method of claim 12, wherein modifying the response behavior further comprises denying, in the computing device, another request obtained from the request source.

20. The method of claim 19, wherein the requested content identifier is a first requested content identifier, and the other request comprises a second requested content identifier included in the plurality of content identifiers.

* * * * *

UNITED STATES PATENT AND TRADEMARK OFFICE
CERTIFICATE OF CORRECTION

PATENT NO. : 9,552,489 B1  
APPLICATION NO. : 14/031935  
DATED : January 24, 2017  
INVENTOR(S) : Siegel et al.

Page 1 of 1

It is certified that error appears in the above-identified patent and that said Letters Patent is hereby corrected as shown below:

In the Claims

Column 12, Line 62, after "generating, in", delete "the" and insert --a--.

Signed and Sealed this  
Ninth Day of May, 2017

Michelle K. Lee  
*Director of the United States Patent and Trademark Office*